United States Patent [19]

Peniston et al.

[11] 4,018,678

[45] Apr. 19, 1977

[54] METHOD OF AND APPARATUS FOR FLUID FILTRATION AND THE LIKE WITH THE AID OF CHITOSAN

[76] Inventors: Quintin P. Peniston, Rte. 7, Box 7710, Bainbridge Island, Wash. 98110; Edwin Lee Johnson, Rte. 5, Box 4246, Issaquah, Wash. 98027

[22] Filed: Aug. 9, 1974

[21] Appl. No.: 496,123

[52] U.S. Cl. .................................. 210/36; 210/75; 210/502; 55/74; 55/528; 131/269; 423/245

[51] Int. Cl.$^2$ ........................................ B01D 53/16

[58] Field of Search ............... 210/54, 75, 502, 36, 210/37 R, 37 B; 55/74, 97, 98, 387, 528; 131/261 R, 262 A, 269; 260/211 R; 423/245

[56] References Cited

UNITED STATES PATENTS

| | | | |
|---|---|---|---|
| 2,072,771 | 3/1937 | Rigby | 260/211 R |
| 3,242,073 | 3/1966 | Guebert et al. | 210/75 X |
| 3,352,424 | 11/1967 | Guebert et al. | 210/75 X |
| 3,478,880 | 11/1969 | Harris | 210/54 X |
| 3,533,940 | 10/1970 | Peniston et al. | 210/54 X |
| 3,538,920 | 11/1970 | Davis | 131/269 |
| 3,562,154 | 2/1971 | Davis et al. | 210/54 X |
| 3,879,376 | 4/1975 | Vanlerberghe | 260/211 R |

*Primary Examiner*—Thomas G. Wyse
*Attorney, Agent, or Firm*—Rines and Rines

[57] ABSTRACT

This disclosure is concerned with the use of chitosan as a coating or packing in fluid filtration and other systems to provide a high ratio of surface-to-volume of reactive material that exposes a maximum number of reactive amino groups for rapid reaction with fluid media passed therethrough.

12 Claims, No Drawings

METHOD OF AND APPARATUS FOR FLUID FILTRATION AND THE LIKE WITH THE AID OF CHITOSAN

The present invention relates to methods of and apparatus for fluid filtration and the like, where the term "fluid" is generically employed to connote liquids, gases and vapors, including smoke, the undesirable components of which are to be removed, or components of which are to be subjected to other reaction with the filtration or other surfaces. More specifically, the invention relates to the novel use of chitosan (or suitable derivatives thereof hereinafter generically referred to as "chitosan") as a coating and/or packing in such and other systems.

The art is, of course, replete with a myriad of filtration techniques and materials for removing undesirable components in fluids and for causing other reactions as the fluid passes through filtration beds or other reactive media. Among the problems encountered with prior filters, however, have been the plugging or clogging with use and the consumption or rendering ineffective of reactive filtering surfaces. Underlying the present invention, however, is the discovery, among other factors, of the highly adaptive use of chitosan as a filtration particle coating and/or packing, in a manner that has been found not only to provide superior physical attributes, but has proven highly reactive to a wide variety of impurities that unexpectedly leave the chitosan in its effective reactive free amino form over extended time periods, despite copious flowing of fluid containing such impurities through the chitosancoated filtration particles or through chitosan particles or packing themselves. It appears that a synergistic or other unpredicted mechanism is peculiarly involved in flowing fluids past a fluid-pervious bed of chitosan particles that imbues them with this unusual and widely diverse reactive life.

While we have employed chitosan for its dynamic heavy-molecule precipitating action in removing impurities in liquids, as described in our U.S. Pat. No. 3,533,940, the above and hereinafter described reactive properties in fluid-flow filtration systems and the like involve additional fortuitous reactive properties not in any measure predicted from such precipitation studies.

Chitosan is produced from chitin, a natural carbohydrate polymer comprising the principal structural substance in the shells of crustacea such as crabs, shrimps, lobsters, crayfish, etc. It also occurs in insects and in lesser quantities in many other animal and vegetable organisms. Chitin is a linear polymer of 2-deoxy, 2-acetyl-amino glucose analogous to cellulose in chemical structure. It is insoluble in almost all media except strong mineral acids and due to the acetylated amino group is relatively unreactive.

When chitin is deactylated by treatment with strong alkalis, the product is chitosan which contains one free amino group for each glucose building unit in the polymer. It is still a long chain linear polymer but is now a highly reactive cationic poly-electrolyte material. It will form salts with simple organic acids, such as formic, acetic, tartaric, citric, etc. and is soluble in dilute aqueous solutions of such substances. With polymeric or complex anionic materials such as coloring matters, tannins, many aerosol particles and turbidites in aqueous media, chitosan forms polyelectrolyte complexes. With aldehydes and phenols, condensations have been found to occur rapidly, with the amino groups of chitosan effectively removing such substances from solutions or gaseous mixtures. Since it fortuitously happens that many of the pyrolysis products of tobacco conditioners and paper which occur in cigarette smoke are substances of the above characters, the techniques of the present invention have been found particularly useful for ready reaction with chitosan.

An object of the present invention, accordingly, is to provide a new and improved fluid filtration method and apparatus employing chitosan.

A further object is to provide a novel cigarette and other smoke filter embodying chitosan.

Still a further object is to provide an improved fluid-flow system containing exposed reactive chitosan.

An additional object is to provide novel high ratio surface-to-volume chitosan-coated reactive materials for more general use, as well.

Other and further objects will be explained hereinafter and will be more fully pointed out in the appended claims. In summary, however, from one of its broad aspects, the invention contemplates a method of fluid-flow-filtration, that comprises, passing fluid containing constituents reactive with amino groups through a filtration region or bed, and disposing chitosan throughout the region or bed to provide a high ratio surface-to-volume of exposed reactive amino groups of the chitosan in contact with the fluid flow. Other features and preferred details are hereinafter set forth.

Turning, first, to the important and still troublesome application of the filtration of cigarette and other smoke, the polymeric carbohydrate chitosan is adapted to be spun into fibers, cast into films or applied as a coating to other suitable filter particles or other media. Its high level of free primary amino groups react, as before explained, with aldehydes, phenols, organic acids and negatively charged particles, thus enabling the removal of such substances from smokes and liquid mixtures. When used as a cigarette filter material, it has been found to reduce remarkably the level of tar in the smoke and also to remove irritating gaseous substances.

Cigarette filters employed today generally depend on mechanical impingement and/or physical adsorption to remove aerosol particles (tars) and gaseous pyrolysis products of tobacco, conditioners and paper from the smoke. Such prior filters include cellulose, cellulose acetate and activated carbon granules. While these materials are more or less effective in removal of aerosol particles by impingement, their performance in removal of molecularly dispersed substances such as acrolein, formic and acetic acids, acetaldehyde, carbon monoxide, phenols, etc. generally leave much to be desired.

It has been discovered, on the other hand, that chitosan, properly applied or used, has the physical attributes of a filter medium with a chemical composition capable of effective reacting with such smoke ingredients, yielding superior performance as a cigarette filter.

Those skilled in the art, particularly following a reveiw of the hereinafter described applications or examples of successful use of the invention, will readily appreciate that, as a coating on inert particles, chitosan has, of course, broader applications for purification of both smokes and liquids, as well. Physically, chitosan has properties similar to other long chain linear polymers in that it will form fibers and films and can be applied as coatings to many substrate materials.

There are thus many ways in which a suitable filter material can successfully be fabricated from chitosan. In all of these, however, it is desirable to attain a high ratio of surface-to-volume in order that the greatest number of reactive amino groups will be exposed for rapid reaction with smoke components. This may be accomplished by spinning chitosan fibers of small diameter similar to the cellulose acetate now commonly used in filters or by coating other fibers made from non-reactive materials such as cellulose, cellulose acetate or other synthetic textile fibers. In such ways, the physical behaviour of the filter, i.e. pressure drop, condensate retention, plugging characteristics, etc., can be adjusted as desired for a particular application.

Another property of chitosan useful in fabrication of a smoke filter is that while solution occurs with weak organic acids to yield highly viscous solutions, when fibers, films or coatings are prepared from solutions using volatile acids, such as formic or acetic, these are vaporized on drying, leaving the chitosan in its reactive free amino form. Also, since chitosan is non-toxic and rapidly biodegradable, this assists in overcoming disposal problems.

EXAMPLE 1

Ground chitosan flakes were screened retaining particles between 30 and 40 meshes per inch. These were packed between small glass wool plugs in a 10 mm i.d. glass tube which was used as a cigarette holder. The inhaled smoke was very smooth with no throat irritation. A 3 cm. length of packed chitosan was effective for about ten cigarettes. The above test was repeated using a commercial filter cartridge normally packed with silica gel granules. These were removed and replaced with ground chitosan. Results were about the same as with the glass tube.

EXAMPLE 2

An automatic smoking machine was constructed following suggestions of J. A. Bradford, W. R. Harlan and H. R. Hannar, *Ind. Eng. Chem.*, 28:836 (1936). It had a 1 minute puff cycle with a puff volume of 40 milliliters and 2 second duration. Cambridge glass fiber filter discs were used to collect aerosol particles (tar). These were dried and the increase in weight determined. Results were as follows:

| Test No. | Cigarette | Filter Used | Tar (mg) |
| --- | --- | --- | --- |
| 1 | "Camel" regular | None | 39 |
| 2 | "Camel" regular | 163 mg chitosan (granules) 40 mg glass | 31 |
| 3 | "Camel" regular | None | 47 |
| 4 | "Camel" regular | 220 mg chitosan (granules) 85 mg glass wool | 21 |
| 5 | "Camel" regular | cellulose acetate Tow from "Marlborough" cigarette 145 mg | 26 |
| 6 | "Camel" regular | 160 mg fibrous chitosan | 20 |

Chitosan fibers were prepared using a 5 percent solution of chitosan in dilute acetic acid. Fibers were extruded through a cellulose acetate spinneret using compressed nitrogen. They were dehydrated in an acetone bath and then collected and dried to remove solvent and acetic acid, thus freeing the amino groups of the chitosan. The fibers of chitosan were coarse and much larger in average diameter (about 150 microns) than the cellulose acetate tow used for comparison (about 30 microns). Results indicate improved performance for the chitosan fibers but also need for smaller fibers (of the order of several tens of microns in diameter) and greater surface area.

The following example illustrates the more generic character of the invention in chitosan-coating applications.

EXAMPLE 3

Small plastic beads about 0.3 mm diameter were coated with a four percent solution of chitosan. The coated beads were dried in an air oven at 90° C and were then packed in a glass tube to form a filter bed. A water suspension of submicron sized clay particles having a turbidity of about 15 Jackson units not readily removable by normal flocculation procedures was passed down over the bed of chitosan coated beads at a flow rate of about 10 ml per square centimeter per minute. Turbidites were concentrated in a band at the top of the column and the effluent was sparkling clear.

The above examples demonstrate filter compositions for the removal of pyrolysis products from gaseous and aerosol mixtures resulting from partial combustion of vegetable material in which chitosan is used as a principal functional ingredient. The use of chitosan alone or in combination with other materials in a filter for improving the quality of cigarette smoke has been shown. The use of chitosan as a coating on inert particles or members in the form of spheres, fibers or other shapes, with the combination comprising a filter or absorption medium for removal of substances from gaseous, aerosol or liquid mixtures has also been demonstrated. Further applications and modifications will readily suggest themselves to those skilled in the art, and such are considered to fall within the spirit and scope of the invention as defined in the appended claims.

What is claimed is:

1. A method of fluid-flow filtration that comprises providing a filtration bed having chitosan disposed throughout the bed with a high ratio surface-to-volume of exposed reactive amino groups of the chitosan, and passing fluid containing constituents reactive with said amino groups through the filtration bed.

2. A method as claimed in claim 1 and in which the providing step comprises providing bed particles and coating the bed particles with chitosan.

3. A method as claimed in claim 1 and in which the providing step comprises packing chitosan particles within the bed.

4. A method as claimed in claim 3 in which particles of the order of 30–40 mesh per inch in size are packed within the bed.

5. A method as claimed in claim 1 and in which the providing step comprises packing chitosan fibers along the bed.

6. A method as claimed in claim 5 in which fibers of the order of 150 microns in average diameter or less are packed along the bed.

7. A method as claimed in claim 1 and in which said fluid is cigarette smoke and said constituents comprises pyrolysis products of cigarette materials.

8. A method as claimed in claim 1, and in which the providing step comprises applying a solution of chitosan to members selected from the group consisting of inert particles, beads, spheres, fibers and surfaces, drying the resulting chitosan-coated members, and packing said members into said filtration bed.

9. A method as claimed in claim 8 and in which the chitosan applied is of the order of a four percent solution.

10. A method as claimed in claim 1 and in which the providing step comprises coating chitosan upon substrate filter members of the filtration bed.

11. A method as claimed in claim 10 and in which the chitosan is coated upon filter members of the order of a millimeter in size.

12. A method of removing from cigarette smoke constituents comprising pyrolysis products, acrolein, formic and acetic acids, acetaldehyde, phenols and negatively charged particles, that comprises providing a filtration region having chitosan disposed throughout the region with a high ratio surface-to-volume of exposed reactive amino groups of the chitosan, and passing the smoke through the filtration region.

* * * * *